(12) United States Patent
Kang

(10) Patent No.: US 9,360,970 B2
(45) Date of Patent: Jun. 7, 2016

(54) TOUCH SCREEN PANEL

(75) Inventor: Sung-Ku Kang, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 666 days.

(21) Appl. No.: 13/067,478

(22) Filed: Jun. 3, 2011

(65) Prior Publication Data

US 2012/0103777 A1    May 3, 2012

(30) Foreign Application Priority Data

Oct. 27, 2010    (KR) .................... 10-2010-0105155

(51) Int. Cl.
*G06F 3/041*    (2006.01)
*G06F 3/044*    (2006.01)

(52) U.S. Cl.
CPC ..................... *G06F 3/044* (2013.01)

(58) Field of Classification Search
CPC ....................................... G06F 3/044
USPC .............. 174/257, 260; 178/18.06, 18.08; 200/341, 600; 315/316; 345/76, 173, 345/174, 204; 348/42; 349/58, 110; 359/530; 362/606; 40/107
See application file for complete search history.

(56) References Cited

U.S. PATENT DOCUMENTS

| 2008/0246741 A1* | 10/2008 | Hinata ................. 345/173 |
| 2009/0046072 A1* | 2/2009 | Emig et al. ........... 345/173 |
| 2009/0277676 A1* | 11/2009 | Chang et al. .......... 174/260 |
| 2010/0073336 A1* | 3/2010 | Lee et al. ............. 345/204 |

FOREIGN PATENT DOCUMENTS

| KR | 10-2005-0029895 A | 3/2005 |
| KR | 10-2006-0028497 A | 3/2006 |
| KR | 10-2008-0102446 A | 11/2008 |
| KR | 10-2009-0014437 A | 2/2009 |
| KR | 10-2009-0048263 A | 5/2009 |
| KR | 10-2010-0031301 A | 3/2010 |

* cited by examiner

*Primary Examiner* — Dwayne Bost
*Assistant Examiner* — Sepehr Azari
(74) *Attorney, Agent, or Firm* — Lee & Morse, P.C.

(57) ABSTRACT

A touch screen panel includes a transparent substrate having a screen area, a black matrix area adjacent to an outside of the screen area, and a decoration pattern area in the black matrix area. The touch screen panel also includes a plurality of conductive sensing cells in the screen area, and a black matrix corresponding to the black matrix area. The black matrix is on one surface of the transparent substrate, and the black matrix has one or more openings formed in the decoration pattern area. The touch screen panel further includes a conductive decoration pattern in the opening of the black matrix, and the conductive decoration pattern is grounded through a ground line connected thereto.

19 Claims, 5 Drawing Sheets

TOUCH SCREEN PANEL

CROSS-REFERENCE TO RELATED APPLICATION

This application claims priority to and the benefit of Korean Patent Application No. 10-2010-0105155, filed on Oct. 27, 2010, in the Korean Intellectual Property Office, and entitled: "Touch Screen Panel," the entire content of which is incorporated herein by reference.

BACKGROUND

1. Field

Embodiments relate to a touch screen panel, and to a touch screen panel including a decoration pattern.

2. Description of the Related Art

A touch screen panel may be an input device that allows a user's instruction to be inputted by selecting an instruction content displayed on a screen of an image display or the like with a user's hand or an object.

The touch screen panel may be formed on a front face of the image display to convert a contact position into an electrical signal. The user's hand or the object may be in contact, e.g., direct contact, with the touch screen panel at a contact position. Accordingly, the instruction content selected at the contact position may be inputted as an input signal to the image display.

Since such a touch screen panel can be substituted for a separate input device connected to an image display, such as a keyboard or mouse, the application fields for a touch screen panel have been gradually extended.

SUMMARY

Embodiments may be realized by providing a touch screen panel that includes a transparent substrate defined by a screen area, a black matrix area formed at the outside of the screen area, and a decoration pattern area disposed in the black matrix area. A black matrix is formed to correspond to the black matrix area on one surface of the transparent substrate, and the black matrix has one or more openings formed in the decoration pattern area. A conductive decoration pattern is disposed in the opening of the black matrix, and a plurality of conductive sensing cells is disposed in the screen area. The conductive decoration pattern is grounded through a ground line connected thereto.

The conductive decoration pattern may include a plurality of patterns, and all the plurality of patterns may be electrically connected to one another and/or a common line.

The plurality of patterns that constitute the conductive decoration pattern may be integrally patterned with the ground line.

The ground line may be formed at both sides of the transparent substrate.

The touch screen panel may further include a plurality of outer lines disposed in the black matrix area to connect the conductive sensing cells by the line along a first or second direction to an external driving circuit.

The conductive decoration pattern may be formed of the same material in the same layer as the outer lines.

The conductive decoration pattern and the outer lines may be formed of the same metallic material.

The black matrix may be formed along the outline on a bottom surface of the transparent substrate, and the touch screen panel may further include an overcoating layer entirely formed on the bottom surface of the transparent substrate having the black matrix formed thereon.

The conductive decoration pattern and the conductive sensing cells may be formed on the bottom surface of the transparent substrate having the overcoating layer formed thereon.

The conductive decoration pattern and the conductive sensing cells may be formed on one surface of a transparent film, and the transparent film may be attached to the bottom surface of the transparent substrate on which the black matrix and the overcoating layer are formed.

The conductive decoration pattern may include a logo pattern.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
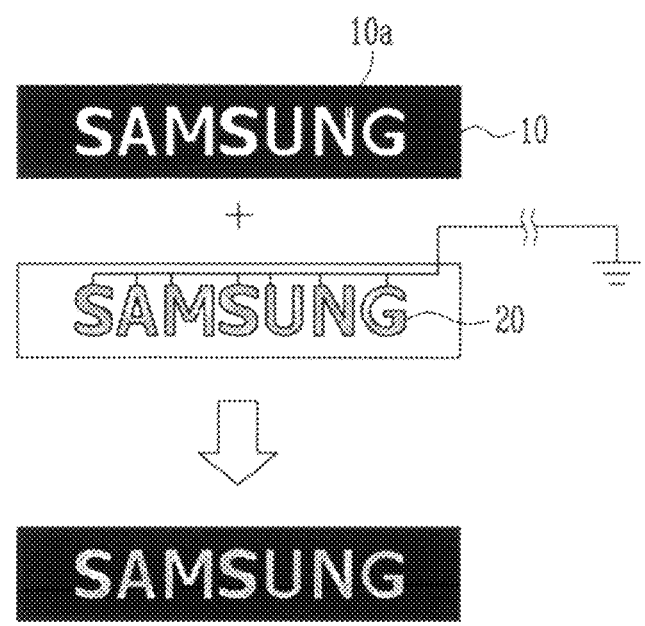
FIG. 1 illustrates a plan view schematically showing an example of a decoration pattern according to an exemplary embodiment.

Korean Patent Application No. 10-2010-0105155, filed on Oct. 27, 2010, in the Korean Intellectual Property Office, and entitled: "Touch Screen Panel" is incorporated by reference herein in its entirety.

In the following detailed description, only certain exemplary embodiments of have been shown and described, simply by way of illustration. As those skilled in the art would realize, the described embodiments may be modified in various different ways, all without departing from the spirit or scope of the present invention. In the figures, the dimensions of layers and regions may be exaggerated for clarity of illustration. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements.

Hereinafter exemplary embodiments will be described in detail with reference to the accompanying drawings.

FIG. 1 illustrates a plan view schematically showing an example of a decoration pattern according to an exemplary embodiment.

Referring to FIG. 1, the decoration pattern may include a black matrix 10 in which an opening 10a corresponding to a predetermined pattern such as a logo pattern is formed. A conductive decoration pattern 20 may be disposed beneath the black matrix 10. The conductive decoration pattern 20 may be disposed in the opening 10 formed in the black matrix 10.

The conductive decoration pattern 20 may be grounded. For example, in a case where the conductive decoration pattern 20 constitutes a plurality of characters or a picture, conductive decoration patterns that constitute the plurality of characters or the picture may all be connected to a ground.

Accordingly, it is possible to minimize, reduce, and/or prevent the conductive decoration pattern 20 from acting as reception noise of a radio signal. Thus, the decoration pattern according to this embodiment may be usefully applied to radio devices such as cellular phones.

With the development of touch screen panel technologies, studies are being actively conducted to develop a radio device having a touch screen panel as an input unit. If the decoration pattern according to the embodiment is simultaneously formed with a touch screen panel in the process of manufacturing the touch screen panel by applying the decoration pattern to a radio device having the touch screen panel, the manufacturing process can be simplified, and manufacturing cost can be reduced. Hereinafter, an embodiment related to the touch screen panel will be described in detail.

Figure 2:
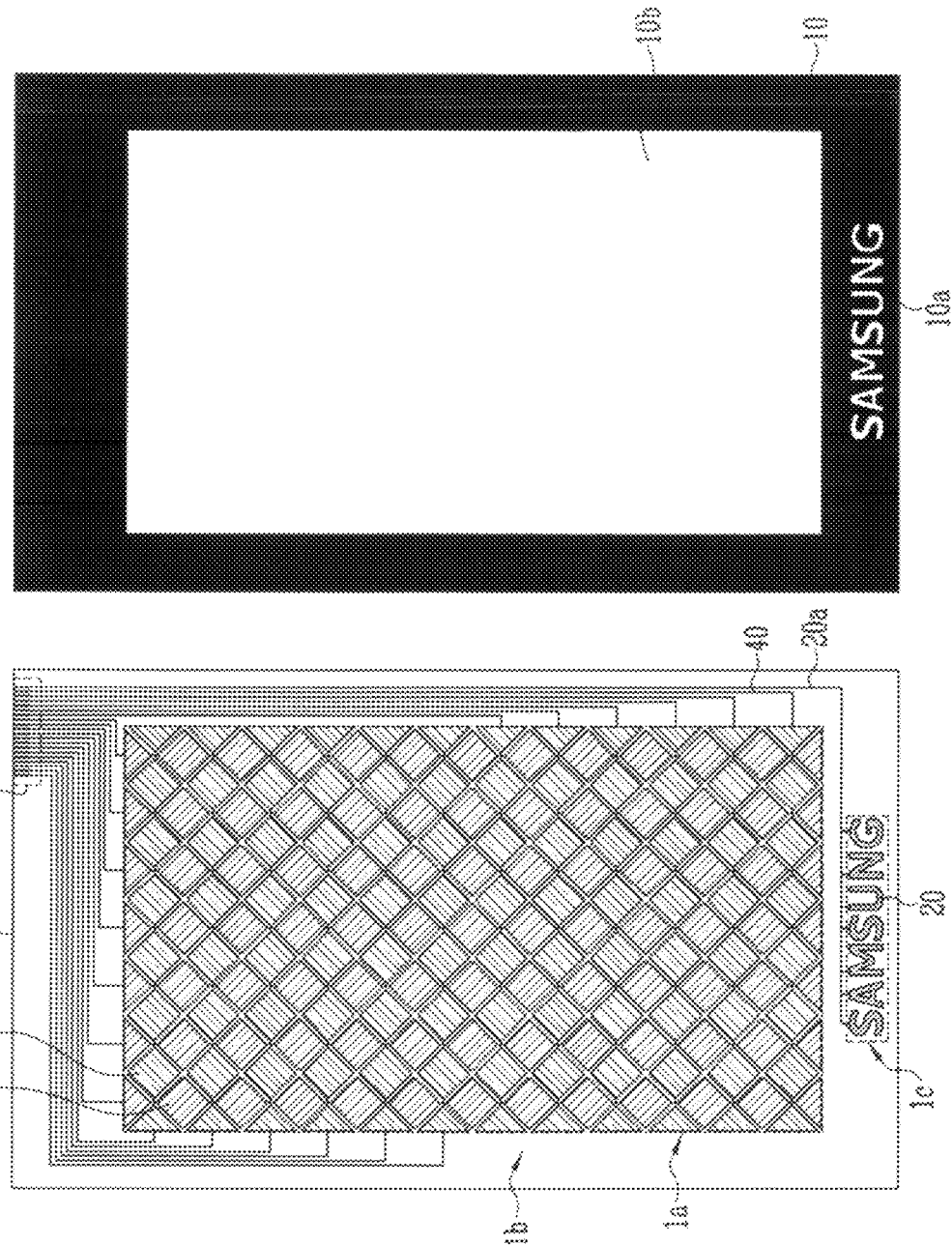
FIG. 2 illustrates an exploded plan view schematically showing a touch screen panel according to an exemplary embodiment.
Figure 3:
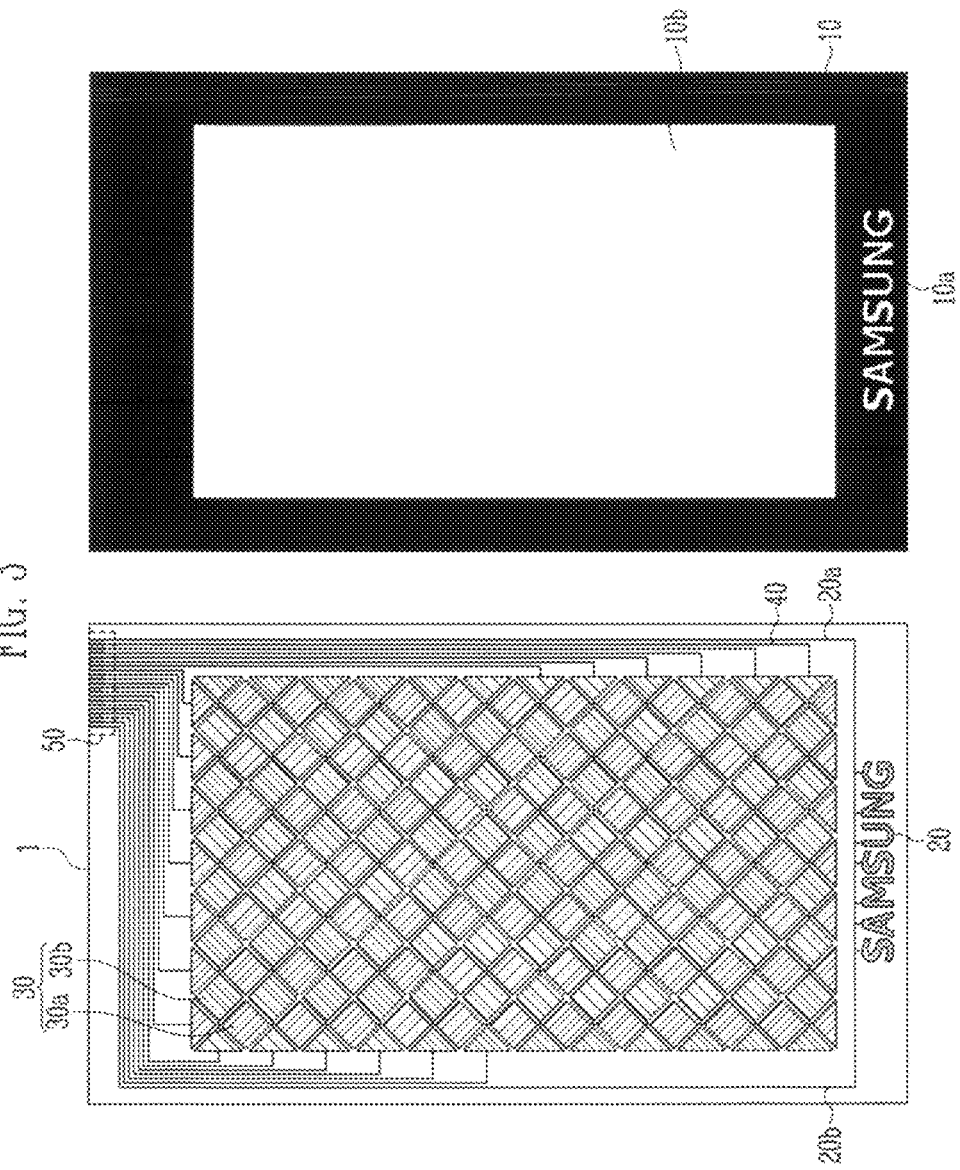
FIG. 3 illustrates an exploded plan view schematically showing a modification of the touch screen panel shown in FIG. 2.
Figure 4:
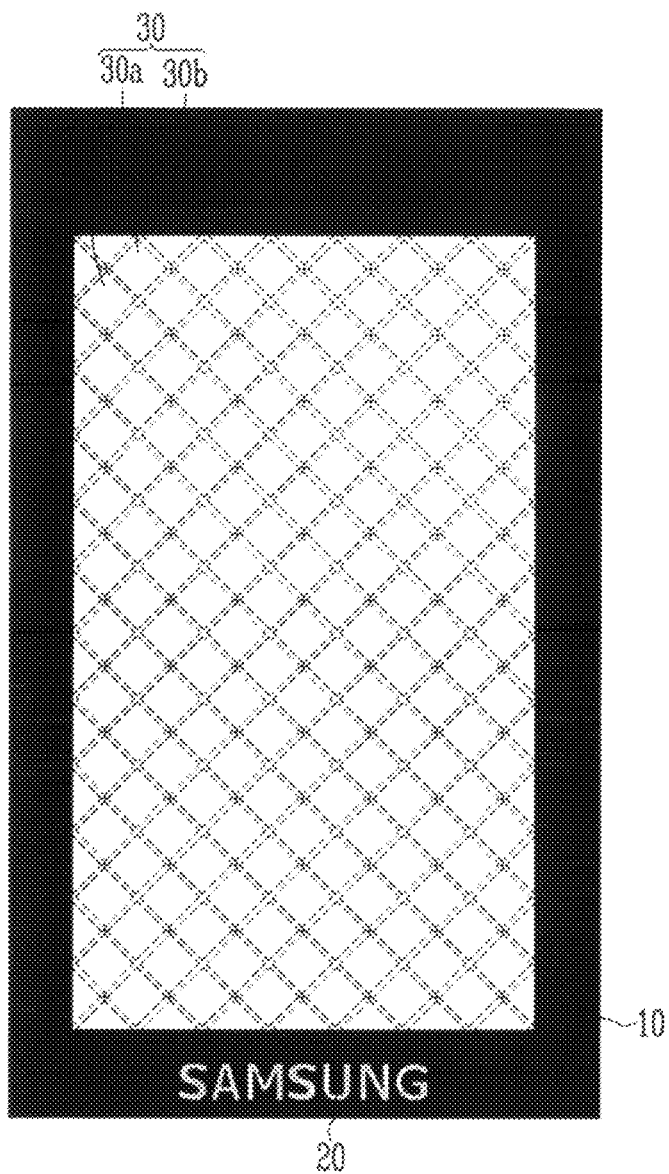
FIG. 4 illustrates an assembled plan view of the touch screen panel shown in FIGS. 2 and 3.

FIG. 2 illustrates an exploded plan view schematically showing a touch screen panel according to an exemplary embodiment. FIG. 3 illustrates an exploded plan view schematically showing a modification of the touch screen panel shown in FIG. 2. For convenience of illustration, a black matrix is separately shown in FIGS. 2 and 3 so that the detailed configuration of the touch screen panel is more apparently illustrated. FIG. 4 illustrates an assembled plan view of the touch screen panel shown in FIGS. 2 and 3.

Although a capacitive touch screen panel is shown in FIGS. 2 to 4, embodiments are not necessarily limited to the capacitive touch screen panel. It will be apparent that the technical spirit of the present invention, which will be described later, can be applied to other panels, such as a resistive overlay touch screen panel and the like.

Referring to FIGS. 2 to 4, the touch screen panel, according to an exemplary embodiment, may include a transparent substrate 1 defined by a screen area 1a, a black matrix area 1b formed at the outside of the screen area 1a, and a decoration pattern area 1c disposed in the black matrix area 1b. A black matrix 10 may be formed to correspond to the black matrix area 1b on one surface of the transparent substrate 1. A conductive decoration pattern 20 may be disposed in the decoration pattern area 1c. A plurality of conductive sensing cells 30 may be disposed in the screen area 1a. A plurality of outer lines 40 may be disposed in the black matrix area 1b to, e.g., connect the conductive sensing cells 30 by the line along first or second direction to an external driving circuit (not shown).

Referring to FIGS. 2 and 3, the black matrix 10 is shown separately from the transparent substrate 1 having the conductive sensing cells 30 and the like so that it does not cover the arrangement of other components. The black matrix 10 may be disposed closer to the side of a user than another component such as the conductive sensing cells 30 or the conductive sensing pattern 20. Accordingly, as shown in FIG. 4, the outer lines 40 disposed below the black matrix 10 may be covered by the black matrix 10, so that it is possible to minimize, reduce, and/or prevent the visualization of the outer lines 40.

Openings 10a and 10b for exposing the conductive decoration pattern 20 formed below the black matrix 10 and a screen may be formed in the black matrix 10.

That is, the black matrix 10 may be provided with one or more openings. For examples, the black matrix 10 may include openings 10a formed in the decoration pattern area 1c, corresponding to the conductive decoration pattern 20 to be exposed. The black matrix 10 may include the opening 10b formed corresponding to the screen area 1a.

The conductive decoration pattern 20 may be disposed in the decoration pattern area 1c defined in the black matrix area 1b at one side of the screen area 1a. Particularly, the conductive decoration pattern 20 may be disposed in the opening 10a of the black matrix 10 so as to be recognized even at the exterior of the touch screen panel. The conductive decoration pattern 20 may include a plurality of patterns. Each of the plurality of patterns in the conductive decoration pattern 20 may be connected to one another, e.g., as shown in FIG. 1. The plurality of patterns may be electrically connected to a common line in a series arrangement or in a parallel arrangement.

The conductive sensing cells 30 may be disposed in the screen area 1a on one side of the transparent substrate 1. The conductive sensing cells 30 may be formed of a transparent electrode material such as indium tin oxide (ITO). The conductive sensing cells 30 may include first sensing cells 30a connected in a first direction and second sensing cells 30b connected in a second direction. Meanwhile, for convenience of illustration, it is assumed in this embodiment that the screen area 1a is set to correspond to a touch active area of a display panel. However, embodiments not limited thereto. For example, only a portion of the screen area 1a may be set as the touch active area of the display panel. In this case, the conductive sensing cells 30 may be partially formed only in the touch active area.

The first sensing cells 30a may be formed to be connected in the first direction, e.g., column line direction so that column lines of the first sensing cells 30a are connected to the respective outer lines 40.

The second sensing cells 30b may be formed to be connected in the second direction, e.g., row line direction different from the first direction so that row lines of the second sensing cells 30b may be connected to the respective outer lines 40. The second direction may intersect, e.g., be perpendicular to, the first direction. The second sensing cells 30b may be insulated from the first sensing cells 30a.

The first and second sensing cells 30a and 30b may be positioned in the same layer. The first and second sensing cells 30a and 30b may be respectively connected along the first and second directions by first and second connection patterns (not shown) insulated from each other with an insulating layer interposed therebetween, or may be positioned in different layers from each other with an insulating layer interposed therebetween.

The outer lines 40 may be positioned in the black matrix area 1b, e.g., below the black matrix 10. The outer lines 40 may connect the conductive sensing cells 30 to an external driving circuit (not shown) such as a position detecting circuit through, e.g., a pad portion 50.

Since the outer lines 40 may be disposed in the black matrix area 1b while avoiding the screen area 1a on which an image is displayed, the material of the outer lines 40 may be selected in a wide range. Therefore, the outer lines 40 may be formed of not only a transparent electrode material used to form the conductive sensing cells 30 but also a low-resistance metallic material such as molybdenum (Mo), silver (Ag), titanium (Ti), copper (Cu), aluminum (Al), and/or Mo/Al/Mo.

The touch screen panel described above is disclosed as an example of the capacitive touch screen panel. If a contact object such as a user's finger or stylus pen comes in contact with the touch screen panel, a change in capacitance caused by a contact position is transferred from the conductive sensing cells 30 to the driver circuit (not shown) via, e.g., the outer lines 40 and the pad portion 50.

The change in capacitance may be converted into an electrical signal by X and Y input processing circuits (not shown), thereby detecting the contact position.

In this embodiment, the conductive decoration pattern 20 may be stably grounded while being connected to an external ground power source, case or the like through a ground line 20*a* connected thereto. Particularly, in a case where the conductive decoration pattern 20 includes a plurality of patterns for displaying a specific word, picture or the like, such as a logo pattern, the plurality of patterns may be electrically connected to be grounded.

One ground line 20*a* may be formed at one side of the transparent substrate 1, e.g., as shown in FIG. 2, or two ground lines 20*a* and 20*b* may be respectively formed at both sides of the transparent substrate 1, e.g., as shown in FIG. 3. This may be variously modified.

As described above, the conductive decoration pattern such as a logo pattern may be grounded through the ground lines 20*a* and 20*b*, so that it is possible to minimize, reduce, and/or prevent the conductive decoration pattern 20 from causing reception noise of a radio signal and to minimize, reduce, and/or prevent the conductive decoration pattern 20 from acting as parasitic capacitance. Accordingly, it is possible to provide a touch screen panel that minimized, reduces, and/or prevents the degradation of reception sensitivity and improves touch sensitivity.

When the conductive decoration pattern 20 is formed on the same substrate as the touch screen panel as described in this embodiment, other components provided to the touch screen panel and the conductive decoration pattern 20 may be simultaneously formed, so that it is possible to simplify manufacturing processes and to reduce manufacturing cost.

For example, the conductive decoration pattern 20 and the ground line 20*a* connected to the conductive decoration pattern 20 can be simultaneously formed in the process of forming the outer lines 40 that connect the conductive sensing cells 30 by the line along the first or second direction to the external driving circuit.

According to an exemplary embodiment, the conductive decoration pattern 20 and the ground line 20*a* connected to the conductive decoration pattern 20 may be formed of a metallic material used to form the outer lines 40. That is, the conductive decoration pattern 20 and the ground line 20*a* connected to the conductive decoration pattern 20 may be formed of the same material in the same process as the outer lines 40. In this instance, the conductive decoration pattern 20 and the ground line 20*a* may be integrally patterned, so that the process can be more simplified.

Figure 5:
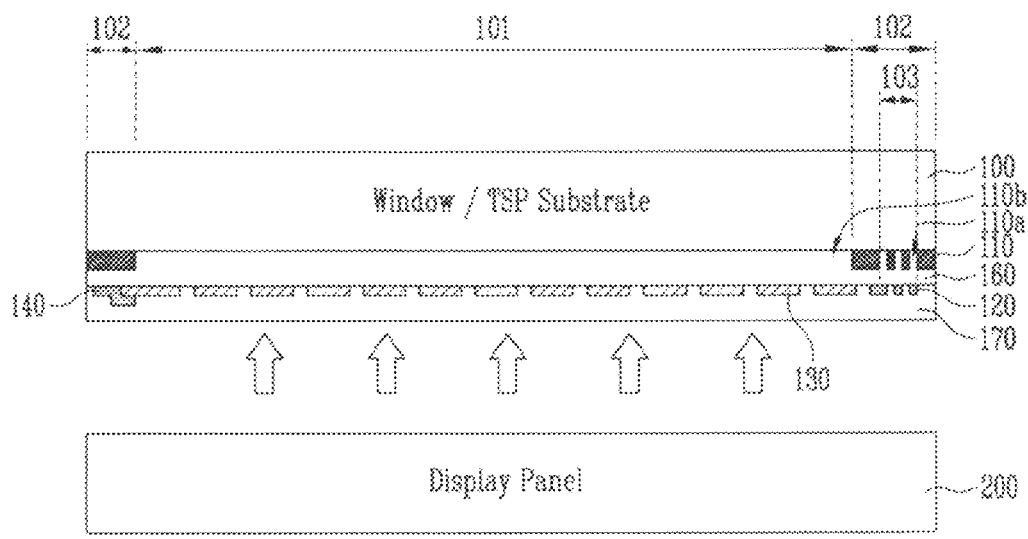
FIG. 5 illustrates a sectional view of a touch screen panel according to an exemplary embodiment.

FIG. 5 illustrates a sectional view of a touch screen panel according to an exemplary embodiment, which shows an example of a touch screen panel with an integrated window. In FIG. 5, a display panel disposed below the touch screen panel may be variously implemented as an organic light emitting display panel, a liquid crystal display panel and the like. Since their configurations may include technologies known in the art, detailed description of the display panel will be omitted.

Referring to FIG. 5, the touch screen panel according to an exemplary embodiment may include a transparent substrate 100 that becomes a base substrate of the window and the touch screen panel. The transparent substrate 100 may have thereon a black matrix 110, an overcoating layer 160, conductive sensing cells 130, outer lines 140 and a conductive decoration pattern 120, which are sequentially formed on a bottom surface of the transparent substrate 100. A protection layer 170 may be entirely formed on the bottom surface of the transparent substrate 100, e.g., covering the outer lines 140, the conductive decoration pattern 120, and the sensing cells 130.

The black matrix 110 may be formed in a black matrix area 102 along at least the outline on the bottom surface of the transparent substrate 100. The black matrix 110 may have an opening 110*a* that corresponds to the conductive decoration pattern 120. The black matrix 110 may also have an opening 110*b* corresponding to a screen area 101.

The overcoating layer 160 may be formed on, e.g., entirely formed on, the bottom surface of the transparent substrate 100 having the black matrix 110 formed thereon.

The conductive sensing cells 130, the outer lines 140 and the conductive decoration pattern 120 may be formed on the bottom surface of the transparent substrate 100 having the overcoating layer 160 formed thereon. The conductive sensing cells 130 may be disposed in the screen area (or touch active area) 101, and the outer lines 140 and the conductive decoration pattern 120 may be disposed in the black matrix area 102.

Particularly, the conductive decoration pattern 120 may be formed in a decoration pattern area 103 within the black matrix area 102. The conductive decoration pattern 120 may be exposed by the opening 110*a* of the black matrix 110.

Although it has been illustrated in FIG. 5 that the outer lines 140 are formed after the conductive sensing cells 130 are formed, their stacking order may be changed.

The conductive sensing cells 130, the overcoating layer 160, the protection layer 170 and the like, disposed in the screen area 101, may be formed of a transparent material so as to allow light generated from the display panel to be transmitted thereto. The outer lines 140, the conductive decoration pattern 120 and the like, disposed in the black matrix area 103, may be formed of an opaque material.

As described above, the touch screen panel may be implemented by integrally forming the window substrate and the touch screen panel. For example, patterns for implementing the touch screen panel may be formed on the window substrate, so that it is possible implement a touch screen panel with an integrated window obtained by integrally forming the transparent substrate 100 and the window substrate. In this case, it is possible to decrease the thickness of an image display using the touch screen panel.

Figure 6:
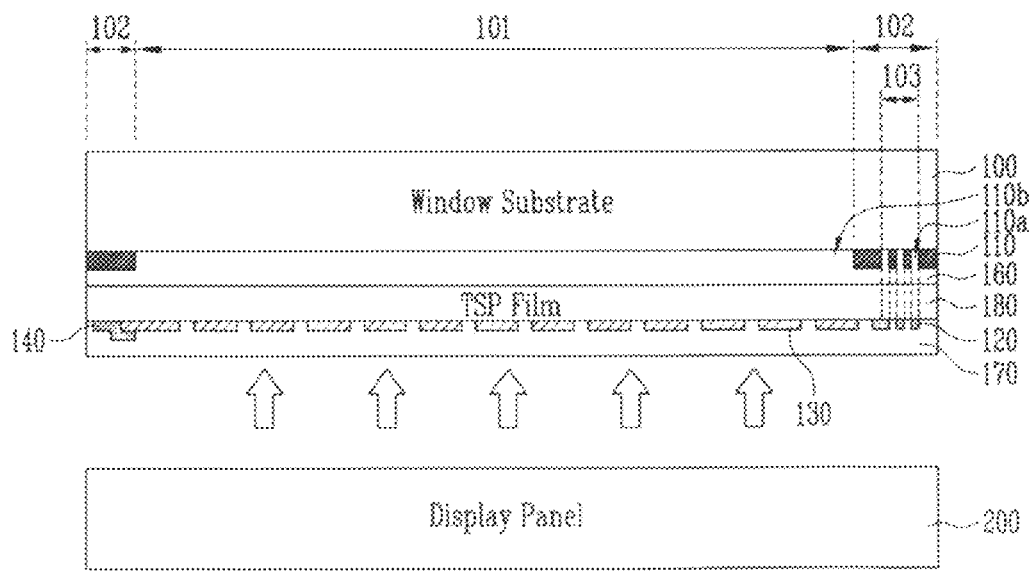
FIG. 6 illustrates a sectional view of a touch screen panel according to exemplary embodiment.

FIG. 6 illustrates a sectional view of a touch screen panel according to another exemplary embodiment. In FIG. 6, components identical or similar to those of FIG. 5 are designated by the same reference numerals, and their detailed descriptions will be omitted.

Referring to FIG. 6, touch sensing patterns, such as the conductive sensing cells 130 and the outer lines 140, and the conductive decoration pattern 120 may be formed on one surface of a transparent film 180 such as a PET film. The transparent film 180 may be attached to the bottom surface of the transparent substrate that is a window, on which the black matrix 110 and the overcoating layer 160 are formed.

The transparent film 180 may perform the function of, e.g., an anti-scattering film, so that it is possible to enhance the mechanical stability of the touch screen panel combined with the window. For example, the transparent film 180 may be disposed between the overcoating layer 160 and the conductive sensing cells 130.

By way of summation and review, a touch screen panel may recognize a touch event generated in a screen area as an input signal by forming conductive sensing cells in a screen area on which an image may be displayed. That is, in an image display provided with the touch screen panel, the screen area may be set as a display area for displaying an image and a touch active area to which a touch is inputted.

As a general matter, a conductive decoration pattern such as a logo pattern may be formed at one side of the touch area. When the touch screen panel having the conductive decoration pattern formed therein is applied to a radio device such as a cellular phone, the conductive decoration pattern may cause a reception noise of a radio signal.

As described above, according to exemplary embodiments, a conductive decoration pattern such as a logo pattern may be grounded through a ground line, so that it is possible to minimize, reduce, and/or prevent the conductive decoration pattern from causing reception noise of a radio signal and to minimize, reduce, and/or prevent the conductive decoration pattern from acting as parasitic capacitance. Accordingly, it is possible to form a touch screen panel that minimizes, reduces, and/or prevents the degradation of reception sensitivity and improves touch sensitivity. Accordingly, embodiments may include a touch screen panel capable of minimizing, reducing, and/or preventing the degradation of a receiving sensitivity of a radio signal.

In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel, comprising:
a transparent substrate including a screen area, a black matrix area around the screen area, and a decoration pattern area in the black matrix area;
a plurality of conductive sensing cells in the screen area on the transparent substrate, the conductive sensing cells including first sensing cells connected in a first direction and second sensing cells connected in a second direction crossing the first direction;
a black matrix corresponding to the black matrix area, the black matrix being on one surface of the transparent substrate, and the black matrix having one or more openings in the decoration pattern area;
an overcoating layer on the black matrix; and
a conductive decoration pattern on the overcoating layer and in and exposed by the one or more openings of the black matrix, the conductive decoration pattern being grounded through a ground line connected thereto and electrically insulated from the plurality of conductive sensing cells, wherein the grounded conductive decoration pattern, the ground line, and the conductive sensing cells are on a same layer.

2. The touch screen panel according to claim 1, wherein the conductive decoration pattern includes a plurality of patterns and all of the plurality of patterns are electrically connected to a common line.

3. The touch screen panel according to claim 2, wherein the plurality of patterns of the conductive decoration pattern are integrally patterned with the ground line.

4. The touch screen panel according to claim 1, wherein the ground line is at both sides of the transparent substrate.

5. The touch screen panel according to claim 1, further comprising a plurality of outer lines disposed in the black matrix area, each of the plurality of outer lines connecting conductive sensing cells along a first direction or second direction to an external driving circuit.

6. The touch screen panel according to claim 5, wherein the conductive decoration pattern is formed of a same material as the outer lines, and the outer lines are on the same layer as the conductive decoration pattern and the conductive sensing cells.

7. The touch screen panel according to claim 5, wherein the conductive decoration pattern and the outer lines are formed of a same metallic material.

8. The touch screen panel according to claim 7, wherein the ground line, the conductive decoration pattern, and the outer lines are formed of a same metallic material.

9. The touch screen panel according to claim 1, wherein the black matrix is along a periphery of a bottom surface of the transparent substrate, and the overcoating layer is on substantially the entire bottom surface of the transparent substrate.

10. The touch screen panel according to claim 9, wherein the conductive sensing cells are on the overcoating layer.

11. The touch screen panel according to claim 9, wherein the conductive decoration pattern and the conductive sensing cells are on one surface of a transparent film, and an opposite surface of the transparent film being on the overcoating layer.

12. The touch screen panel according to claim 1, wherein the conductive decoration pattern includes a logo pattern.

13. The touch screen panel according to claim 1, wherein the conductive decoration pattern is spaced apart from the plurality of conductive sensing cells on the transparent substrate.

14. The touch screen panel according to claim 1, wherein the conductive sensing cells are directly on the overcoating layer.

15. A touch screen panel, comprising:
a transparent substrate including a screen area, a black matrix area adjacent to an outside of the screen area, and a decoration pattern area in the black matrix area;
a plurality of conductive sensing cells in the screen area on the transparent substrate, the conductive sensing cells including first sensing cells connected in a first direction and second sensing cells connected in a second direction crossing the first direction;
a black matrix corresponding to the black matrix area, the black matrix being on one surface of the transparent substrate, and the black matrix having an opening in the decoration pattern area;
a plurality of outer lines disposed in the black matrix area, each of the plurality of outer lines connecting conductive sensing cells along a first direction or second direction to an external driving circuit;
an overcoating layer on the black matrix; and
a conductive decoration pattern on the overcoating layer and in and exposed by the opening of the black matrix, the conductive decoration pattern being grounded through a ground line connected thereto a conductive decoration pattern in the opening of the black matrix, the conductive decoration pattern being grounded through a ground line connected thereto and electrically insulated from the plurality of conductive sensing cells, wherein the conductive sensing cells, the conductive decoration pattern, and the outer lines are on a same layer.

16. The touch screen panel according to claim 15, wherein the conductive decoration pattern is spaced apart from the plurality of conductive sensing cells on the transparent substrate.

17. The touch screen panel according to claim 15, wherein the ground line, the conductive decoration pattern, and the outer lines are formed of a same metallic material.

18. The touch screen panel according to claim 15, wherein the conductive sensing cells are directly on the overcoating layer.

19. A touch screen panel, comprising: a transparent substrate including a screen area, a black matrix area around the screen area, and a decoration pattern area in the black matrix area;

a plurality of conductive sensing cells in the screen area;

a black matrix corresponding to the black matrix area, the black matrix being on one surface of the transparent substrate, and the black matrix having one or more openings in the decoration pattern area;

an overcoating layer on the black matrix; and a conductive decoration pattern on the overcoating layer and in and exposed by the one or more openings of the black matrix, the conductive decoration pattern being grounded through a ground line connected thereto and electrically insulated from the plurality of conductive sensing cells, wherein the grounded conductive decoration pattern and the conductive sensing cells are on a same layer, and wherein the conductive decoration pattern and the conductive sensing cells are directly on one surface of a transparent film, and an opposite surface of the transparent film being directly on the overcoating layer.

* * * * *